United States Patent Office 3,716,918
Patented Feb. 20, 1973

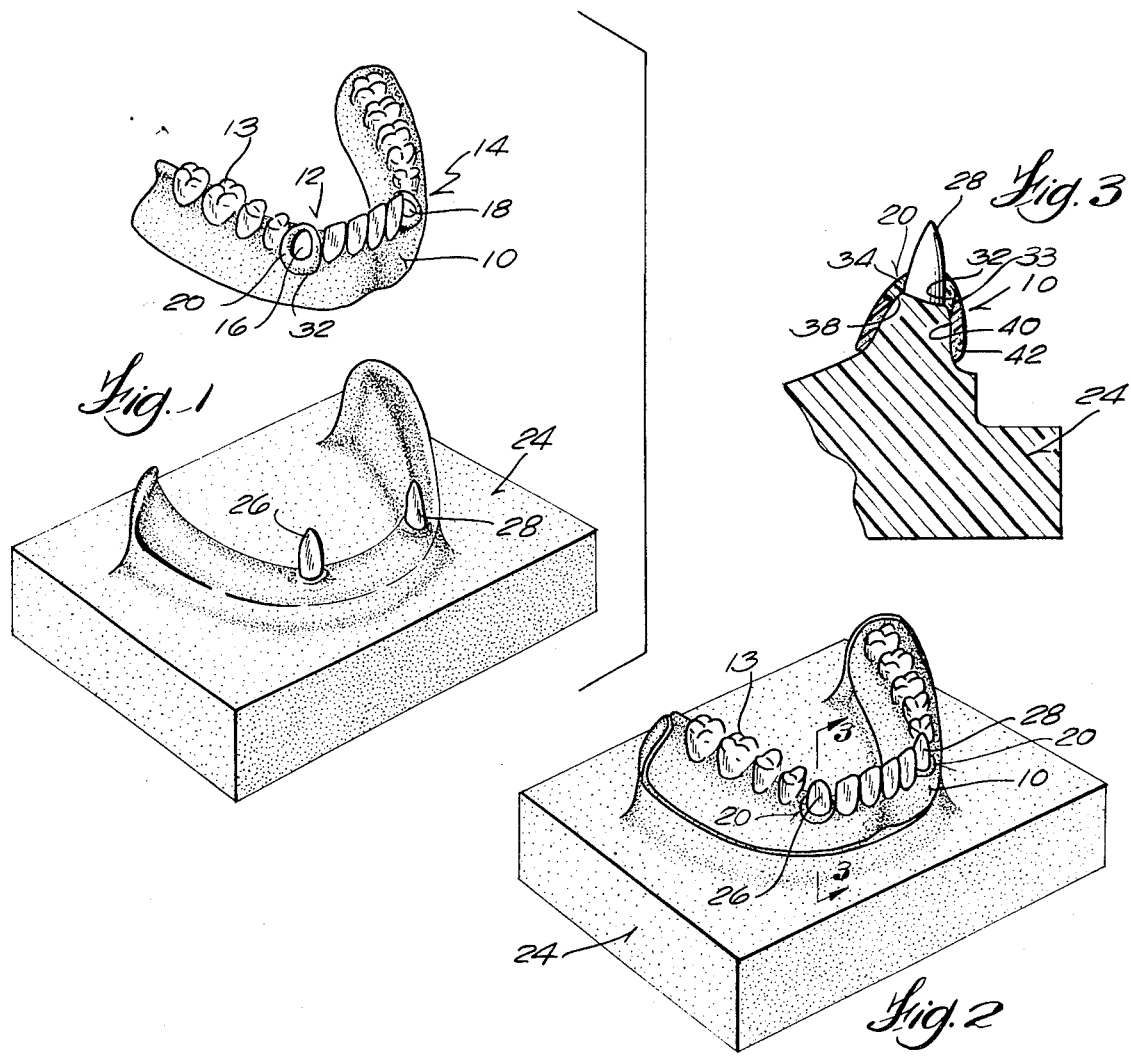

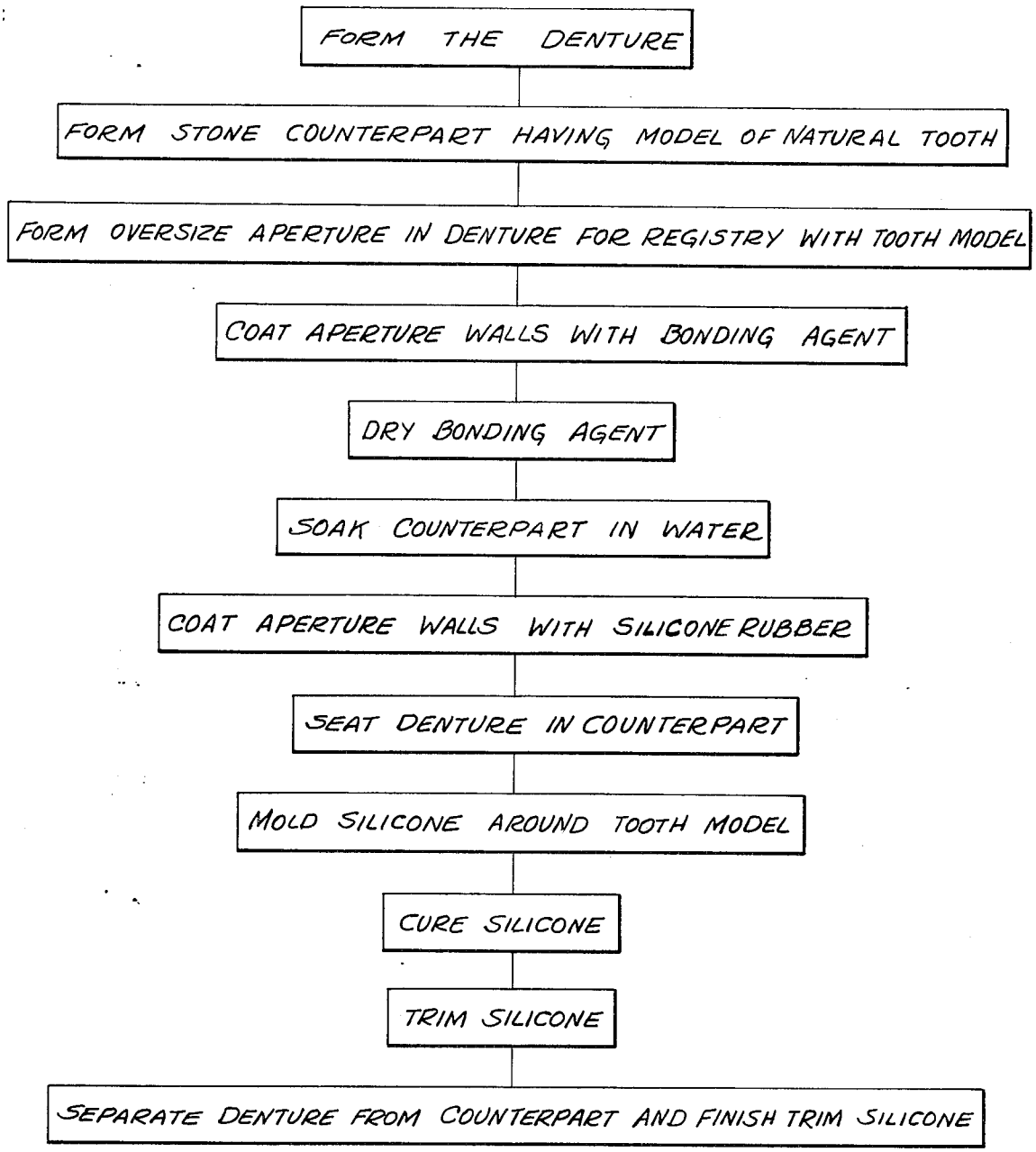

3,716,918
DENTURE COUPLING AND METHOD OF FORMING COUPLING
John W. Tole, Milwaukee, Paul J. Stoiber, Brookfield, and Leroy W. Etzel, Milwaukee, Wis., assignors to Northwest Dental Laboratories, Inc., Milwaukee, Wis.
Filed Sept. 10, 1971, Ser. No. 179,442
Int. Cl. A61c 13/22
U.S. Cl. 32—5
5 Claims

ABSTRACT OF THE DISCLOSURE

A prosthetic denture of the type which is secured in place by coupling with one or more remaining healthy natural teeth, includes apertures in the denture which register with and receive the natural teeth and in which the apertures are provided with silicone rubber gasket liners which are bonded to the aperture walls. The gaskets are formed in the denture by providing oversize apertures in the denture, applying a primer to the denture, and molding silicone rubber in the apertures around a model of the natural teeth on a counterpart. When the silicone rubber has cured, it is trimmed with high speed abrasive stones. The silicone gaskets comfortably, yieldably and securely receive and embrace the natural teeth and provide an air seal to prevent entry of air and particles beneath the denture.

BACKGROUND OF INVENTION

The invention relates to prosthetic denture appliances which utilize one or more remaining natural teeth in the user's mouth to secure the denture in the desired position. Dentures of this type are conventionally secured by various types of metal clasps which couple with the natural teeth. The use of metal clasps can cause tissue laceration, abrasion of the tooth enamel, and entrap food particles. Wear problems are particularly severe when only a single natural tooth is employed for coupling or positioning the denture and thus a single natural tooth is rarely employed to position and secure dentures of this type.

SUMMARY OF INVENTION

The invention provides a denture coupling in which an elastomeric gasket in an aperture in the denture securely embraces a remaining natural tooth received in the aperture and a method of forming the gaskets in the denture. The use of an elastomeric gasket preferably of silicone rubber minimizes wear to the remaining natural teeth thus enabling use of a single remaining natural tooth for securing and positioning the denture as well as use of multiple natural teeth. The translucent silicone rubber also improves the appearance of the denture as compared with the more readily visible metal clasps typically employed in prior art arrangements. The snug fit of the silicone gaskets with the natural teeth also provides an effective air seal particularly when used with upper dentures so that the vacuum between the denture and the mouth further aids in securing the denture in place.

The silicone gaskets are formed in the dentures after construction of the denture is complete with gaps between the artificial teeth for receiving the natural teeth. The first step of the method is to form oversize through apertures in the gaps for receiving the natural teeth. The apertures are primed to form a firm bond with the silicone rubber gaskets. The apertures are then lined with uncured silicone rubber and the denture assembled on a stone counterpart which has replicas or models of the natural tooth or teeth which will be used to anchor the denture. The silicone is molded around the teeth and then cured while the denture is assembled on the counterpart. After the silicone rubber is cured, the excess silicone is trimmed. The denture is then removed from the counterpart and the silicone gasket is finish trimmed and polished with a high speed arbor mounted coarse abrasive stone. The silicone gaskets thus formed yieldably and comfortably receive the natural teeth and afford repetitious separation of the denture with a minium of wear to the natural teeth.

Further objects, advantages and features of the invention will become apparent from the following disclosure.

DESCRIPTION OF DRAWINGS

FIG. 1 is a perspective view of a dental stone counterpart having replicas of natural teeth and a prosthetic denture embodying the coupling gaskets of the invention.

FIG. 2 is a perspective view of the denture shown in FIG. 1 assembled on the counterpart shown in FIG. 1.

FIG. 3 is a sectional view along line 3—3 of FIG. 2.

FIG. 4 is a plan view showing the location of healthy natural teeth which will remain in the mouth after multiple extractions and which can be employed for coupling purposes with the denture.

FIG. 5 is a plan view similar to FIG. 4 showing a further arrangement of natural teeth which can be employed for securing the denture.

FIG. 6 is a flow sheet of the method for forming the coupling gaskets of the invention.

DETAILED DESCRIPTION OF THE PREFERRED EMBODIMENT

In the drawings, FIG. 1 shows a denture 10 formed in the conventional manner from acrylic or plastic material. The denture 10 has gaps 12 and 14 between artificial teeth 13 with through apertures 16 and 18 extending through the denture and lined with the elastomeric coupling gaskets 20 of the invention. FIG. 1 also shows a dental stone counterpart 24 which is formed from an impression taken by the dentist and which includes models or replicas 26, 28 of the natural teeth which will be used for securing and positioning the denture. The model teeth 26, 28 register with the apertures 16 and 18 when the denture 10 is seated on the counterpart 24 as shown in FIG. 2.

In practicing the method of the invention, the apertures 16 and 18 are formed in the gaps 12, 14 of denture 10. The apertures can be drilled or bored with a dental burt, and are oversize to freely receive the natural teeth replicas 26, 28 on the counterpart with sufficient clearance so that a silicone gasket can be formed within the aperture with a gasket wall thickness of about $3/32$ of an inch.

The aperture walls 32 (FIG. 3) thus formed are coated with a silicone rubber primer or bonding agent 33. Tissue-line primer sold by Howmedica, Inc. was successfully tested, although other silicone rubber primers can be employed. The bonding agent is then allowed to dry. The stone counterpart 24 is briefly soaked in water so there is moisture present for effective curing of the silicone rubber. The aperture walls 32 are lined with the uncured silicone rubber which is in a viscous state. Various types of medical or non-toxic silicone rubbers can be used. General Electric GE–RTV Silicone 108 was successfully tested. This silicone rubber does not require mixing with a curing agent, has a translucent appearance, a low durometer reading and adequate tensile strength.

After the aperture walls are coated with a lining of silicone rubber, the denture 10 is assembled on the counterpart 24. The silicone rubber is then manually molded around the natural teeth replicas 26 and 28 on the model, and the assembled denture and counterpart set aside to allow the silicone rubber to cure. With the silicone rubber described above, 24 hours is sufficient to cure the silicone at room temperatures. In the alternative, the silicone can be cured in an oven at generally 100° for one hour.

After the silicone rubber is cured and while the denture is still assembled on the counterpart, the silicone gaskets 20 are trimmed to remove excess material and so that the upper ends 34 (FIG. 2) of the gaskets 20 smoothly taper to and merge with the gum line of the denture 10. The denture is then removed from the counterpart and the silicone gaskets are finish trimmed with high speed coarse arbor mounted abrasive discs or wheels which provide a smooth uniform appearance. The interior of surface 38 (FIG. 3) of the gasket is finished to provide a smooth juncture 40 with the acrylic denture inner wall 42.

The silicone gaskets 20 thus formed provide an effective air seal between the inside of the denture and the patient's gum so that a partial vacuum is formed when the denture is inserted which assists in retaining the denture in place. The seal afforded by the yieldable gaskets also prevents entry of food particles beneath the denture. Because of the lack of wear on the natural teeth due to the comfortable and yieldable properties of the silicone rubber, the coupling arrangement can be employed with a single remaining natural tooth. The silicone gaskets readily yield to afford easy and repetitious removal.

Various patterns of healthy natural teeth can be employed with the gaskets of the invention to secure dentures. The shaded teeth 50 in FIGS. 5 and 6 show two possible patterns.

What is claimed is:

1. In a prosthetic denture appliance of the type adapted for repetitive detachable engagement with a remaining healthy natural tooth, the improvement comprising, walls in the denture defining an aperture for receiving a natural tooth, and elastomeric gasket means formed within said aperture and bonded to said aperture walls and located within said aperture and adapted to sealingly and yieldably engage the natural surfaces of a natural tooth for securing and positioning the denture.

2. The improvement of claim 1 wherein said gasket is constructed of silicone rubber.

3. A method of forming a prosthetic denture which couples with and is positioned by a natural tooth comprising the steps of:
   (1) Forming the denture,
   (2) Forming a stone counterpart having a model of the natural tooth,
   (3) Forming an oversize through aperture in said denture for registering with a tooth model,
   (4) Coating the aperture walls with silicone rubber,
   (5) Seating the denture on the counterpart with the model of the natural tooth in registery in the tooth aperture,
   (6) Molding excess silicone rubber around the tooth model,
   (7) Curing the silicone rubber,
   (8) Trimming the excess silicone rubber from the assembled denture and counterpart,
   (9) Separating the denture from the counterpart and finish trimming silicone rubber with high speed abrasive wheels.

4. The method of claim 3 plus the step of priming the aperture walls prior to coating the aperture walls with silicone rubber.

5. The method of claim 3 plus the step of soaking the stone counterpart in water prior to the step of seating the denture on the counterpart.

References Cited

UNITED STATES PATENTS

| | | | |
|---|---|---|---|
| 456,626 | 7/1891 | Marshall | 32—5 |
| 703,720 | 7/1902 | Dunn | 32—5 |
| 3,327,392 | 6/1967 | Crow | 32—2 |

ROBERT PESHOCK, Primary Examiner